March 18, 1947.  E. J. BOPP  2,417,540
GATE
Filed Nov. 26, 1945

INVENTOR.
E. J. Bopp
BY
Merrill M. Blackburn.
ATTORNEY

Patented Mar. 18, 1947

2,417,540

UNITED STATES PATENT OFFICE 2,417,540

GATE

Enos Jearld Bopp, Illinois City, Ill.

Application November 26, 1945, Serial No. 630,725

3 Claims. (Cl. 39—79)

The present invention relates to an improvement upon the structure of my prior Patent No. 2,116,821. Among the objects of this invention are to provide a structure in which the forward end of the gate may be supported off the ground when the gate has been opened only slightly, or completely, or in any intermediate position; to provide a structure of the type indicated in which it is possible to easily lower the gate from a supported position to a position in which the forward end rests on the ground, regardless of the extent to which the gate has been opened; to provide a wear-resistant face for the supporting edge of the board which supports the weight of the gate; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Reference will now be made in greater detail to the annexed drawings for a more complete description of this invention. In gates of the type used on farms, usually constructed of a plurality of horizontal boards and cross-tie members, it is desirable to have them so constructed that the free end of the gate can be allowed to rest on the ground and therefore not be subject to being inadvertently swung by wind blowing against the gate. It is also desirable to be able to let the free or swinging end of the gate rest on the ground so as to reduce the strain on the gate parts due to the weight of the free end of the gate. It is also desirable to be able to adjust the gate for use on side hills where the ground below the swinging end of the gate may be higher or lower than at the supported end. It is therefore the purpose of this invention to provide a structure which will accomplish these desirable ends.

Figure 4:
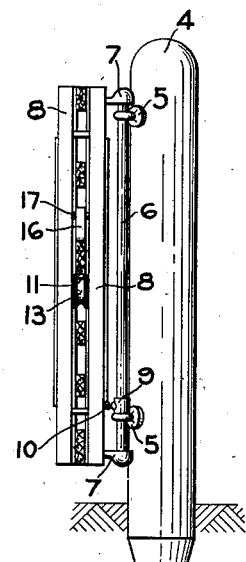
Fig. 4 represents a transverse section of the structure shown in Fig. 3, the same being taken substantially along the plane indicated by the line 4—4, Fig. 3.

The gate 1 of this invention is shown as comprising a plurality of horizontal boards tied together with cross-tie members 2 and 3 and pivotally supported on a post 4. A pair of eye-bolts 5 pass through the post 4 and have the pivot rod 6 passed through the eyes of the bolts 5. A pair of brackets 7 are secured to one of a pair of cross-members 8, preferably in the form of angle irons which are secured together in spaced apart relationship. A collar 9 surrounds the rod 6 and may be held in vertically adjusted position by means of a set screw 10, shown in Fig. 4. A half-round metal 11 is secured to the bottom of the board 12 and rides in the groove of a grooved wheel 13.

A V-shaped brace 14 has the free ends of its arms secured to one of the cross members 8 and has the wheel 13 pivotally mounted in one of the openings 15, the pivot for this pulley being vertically adjustable in the openings 15. It is apparent from the drawings that it is preferable to have two of these V-shaped supports 14 and have them mounted upon opposite sides of the gate for the sake of rigidity of the structure. A dog 16 is pivotally mounted between the cross-members 8 on the pivot 17 and is free to swing in the plane of the gate when not prevented by the board 12.

Figure 1:
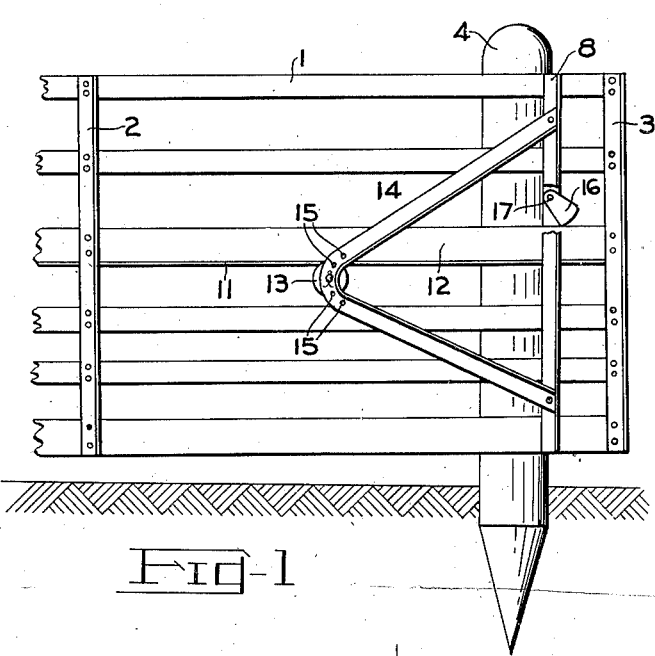
Fig. 1 represents a fragmentary elevation of a gate and its supporting posts, parts of the gate being broken away.
Figure 2:
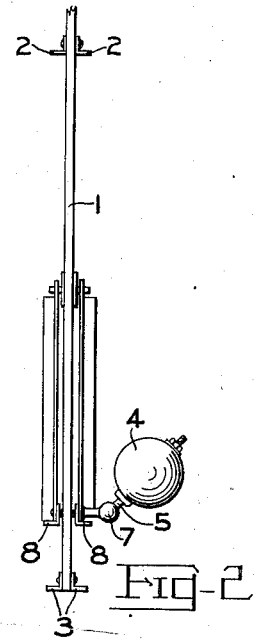
Fig. 2 is a plan view of the structure shown in Fig. 1.

It is clear from the inclination of the boards of the gate 1 with relation to the ground surface, as shown in Fig. 1, that the forward or free end of the gate is in a position to rest on the ground. It is also clear from the showing in Fig. 3 that the free end of the gate is supported above the ground surface. It is also clear that if the gate is in the position shown in Fig. 1 and the free end is raised to or above the horizontal position, the dog 16 will drop into the pendulant position shown in Fig. 3 and will support the free end of the gate off the ground if that end is permitted to lower until stopped by engagement of the dog 16 with the top of the board 12. In this position, the gate can be swung toward either a closed or an open position. In this position, with the dog 16 pressing downwardly against the top edge of the board 12, and the wheel 13 pushing upwardly on the lower edge of this board, the gate will be held in a position to swing freely in either direction. Now, if it is desired to let the swinging end of the gate rest upon the ground or some other support for that end, the gate can be moved longitudinally somewhat, without lifting, and the dog 16 will be swung about its pivot 17 to the position shown in Fig. 1 or to a position inclined in the opposite direction, depending upon the direction that the gate is moved.

Figure 3:
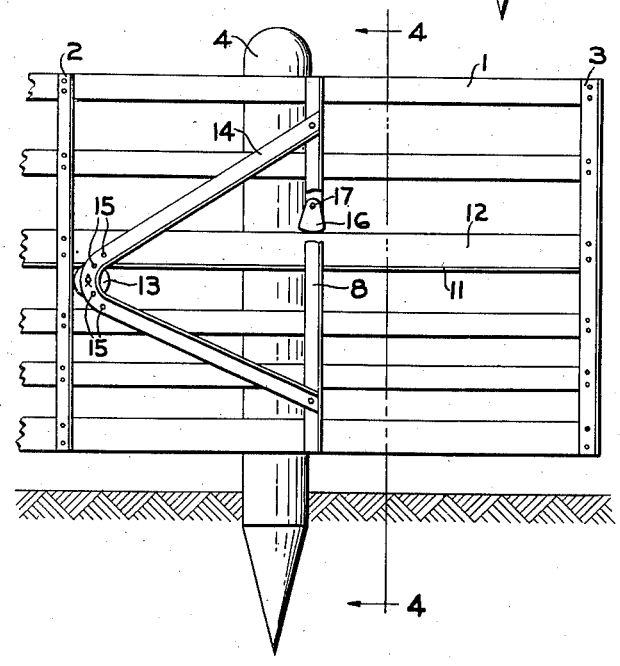
Fig. 3 is a view similar to Fig. 1 with the gate open and the forward end supported off the ground.

Because of the strain on the gate parts and the gate post, it is ordinarily not desirable to leave the gate supported in the manner shown in Fig. 3 for any considerable period of time. It is preferable to have the swinging end of the gate resting on the ground, either when the gate is to be left open or closed for a considerable period of time or when, because of the direction that the wind is blowing, the gate might be swung in an undesirable manner by the wind.

It is of course understood that the specific description of structure set forth above may be departed from without departing from the spirit of my invention as disclosed herein and as defined in the appended claims.

Having now described my invention, I claim:

1. In a gate structure, the combination of a gate having a plurality of longitudinal boards connected together by cross-ties, a post for the support of said gate, a pair of vertical bars between which said gate is slidable, a V-shaped support having the free ends of its arms secured to one of said pair of bars, a grooved wheel pivotally mounted at the closed end of the V-shaped support, and a pendulantly hung dog pivotally mounted between the vertical bars in a position to swing into engagement with the top of one of said longitudinal boards of the gate when it is horizontal, said wheel engaging the under edge of one of said boards at a point remote from said pair of bars for the purpose of supporting the weight of the gate and cooperating with said dog in holding the forward end of the gate off the ground when it is in a horizontal position.

2. In a support for a gate, a pair of substantially parallel bars between which the gate is adapted to slide, a V-shaped supporting member provided with a plurality of transversely extending holes in the closed end of the V, the free ends of the arms of the V being secured to one of the parallel bars, a dog pendulantly hung from one of the bars and located between them in a position to engage the top of one of the gate boards, and a wheel at the closed end of the V and adjustably connected thereto by the moving of its pivot from one to another of the holes through the V.

3. In a gate structure of the type described, a gate comprising longitudinally extending boards, one of which has its lower edge armored with a half-round metal bar, a pair of substantially vertical cross-bars between which said gate is slidable, a pair of V-shaped supporting members upon opposite sides of the gate and having their free ends secured to the cross-bars, a grooved wheel mounted on a pivot connecting the closed ends of the V-shaped members, the metal bar resting in the wheel means for supporting the cross-bars above the earth's surface, and a dog pivotally mounted between the cross-bars in a position to pendulantly engage the top edge of one of the boards when in a horizontal position and to be moved out of pendulant position by longitudinal movement of the gate.

ENOS JEARLD BOPP.

REFERENCES CITED

The following references are of record in the file of this patent:

UNITED STATES PATENTS

| Number | Name | Date |
| --- | --- | --- |
| 199,322 | Sherman et al. | Jan. 15, 1878 |
| 860,422 | Sutherland | July 16, 1907 |
| 2,116,821 | Bopp | Apr. 9, 1937 |
| 228,785 | Sharpe | June 15, 1880 |